United States Patent
Fang et al.

(10) Patent No.: US 9,291,796 B1
(45) Date of Patent: Mar. 22, 2016

(54) IMAGING LENS ASSEMBLY

(71) Applicants: Chunhuan Fang, Shenzhen (CN); Hiroyuki Teraoka, Shenzhen (CN)

(72) Inventors: Chunhuan Fang, Shenzhen (CN); Hiroyuki Teraoka, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/613,722

(22) Filed: Feb. 4, 2015

(30) Foreign Application Priority Data

Sep. 3, 2014 (JP) .................................. 2014-178965

(51) Int. Cl.
*G02B 9/34* (2006.01)

(52) U.S. Cl.
CPC ........................................ *G02B 9/34* (2013.01)

(58) Field of Classification Search
CPC .............. G02B 9/34; G02B 9/60; G02B 9/62; G02B 9/64; G02B 13/004; G02B 13/0045
USPC ......... 359/708–715, 754–757, 763, 764, 766, 359/771–773
See application file for complete search history.

(56) References Cited

U.S. PATENT DOCUMENTS

| 2008/0043346 A1* | 2/2008 | Sano | G02B 13/004 359/715 |
| 2010/0020418 A1* | 1/2010 | Onoda | G02B 9/34 359/715 |
| 2010/0097709 A1* | 4/2010 | Tsai | G02B 13/004 359/715 |

* cited by examiner

*Primary Examiner* — Darryl J Collins
*Assistant Examiner* — Journey Sumlar
(74) *Attorney, Agent, or Firm* — IPro, PLLC; Na Xu

(57) ABSTRACT

An imaging lens assembly includes, in order from an object side to an image side: an aperture stop; a first lens having a positive refractive power; a second lens having a negative refractive power; a third lens having a positive refractive power; a fourth lens having a negative refractive power. A focal length of the imaging lens assembly is f, a focal length of the first lens is f1; a focal length of the second lens is f2; a curvature radius of the object side surface of the first lens is R1; a curvature radius of the image side surface of the first lens is R2; a curvature radius of the object side surface of the second lens is R3; a curvature radius of the image side surface of the second lens is R4, and the lens assembly satisfies the following conditions: $1.08 \leq f1/f \leq 1.20$; $-4.00 \leq f2/f \leq -2.50$; $-1.50 \leq (R1+R2)/(R1-R2) \leq -1.25$; $1.30 \leq (R3+R4)/(R3-R4) \leq 5.00$.

3 Claims, 9 Drawing Sheets

Spherical Aberration (On-axis Chromatic Aberration)

Spherical Aberration (On-axis Chromatic Aberration)

IMAGING LENS ASSEMBLY

FIELD OF THE INVENTION

The present invention relates to an imaging lens assembly, and more particularly to an imaging lens assembly which is suitable for installation into an image input device of a portable telephone or personal computer, a digital camera, a CCD camera used for monitoring purposes, a surveying device, or similar.

DESCRIPTION OF RELATED ART

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been mounted in compact information terminals such as cellular phone sets.

With increases in the miniaturization and pixel density of solid-state image sensing devices, demands have arisen for smaller and higher-performance imaging lenses assembly to be mounted in these imaging apparatuses. The imaging lenses assembly used for such an application includes, in order from an object side to an image side: a first lens having a positive refractive power, a second lens having a negative refractive power, a third lens having a positive refractive power, and a fourth lens having a negative refractive power.

The imaging lens assembly disclosed in Japanese Patent Application Unexamined Publication (Kokai) No. 2014-098896 has four lenses as set forth. However, the distribution of the refractive powers of the first and second lenses and the shape thereof are unsuitable, thus it is worse for miniaturization and wide-angle of the imaging lens assembly.

The imaging lens assembly disclosed in Japanese Patent No. 5370619 has four lenses as set forth. Among these lenses, the distribution of the refractive power of the second lens and the shapes of the first and second lenses are unsuitable, which makes it difficult to miniaturize the imaging lens assembly.

Accordingly, an improved imaging lens assembly which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to several embodiments.

Figure 1:
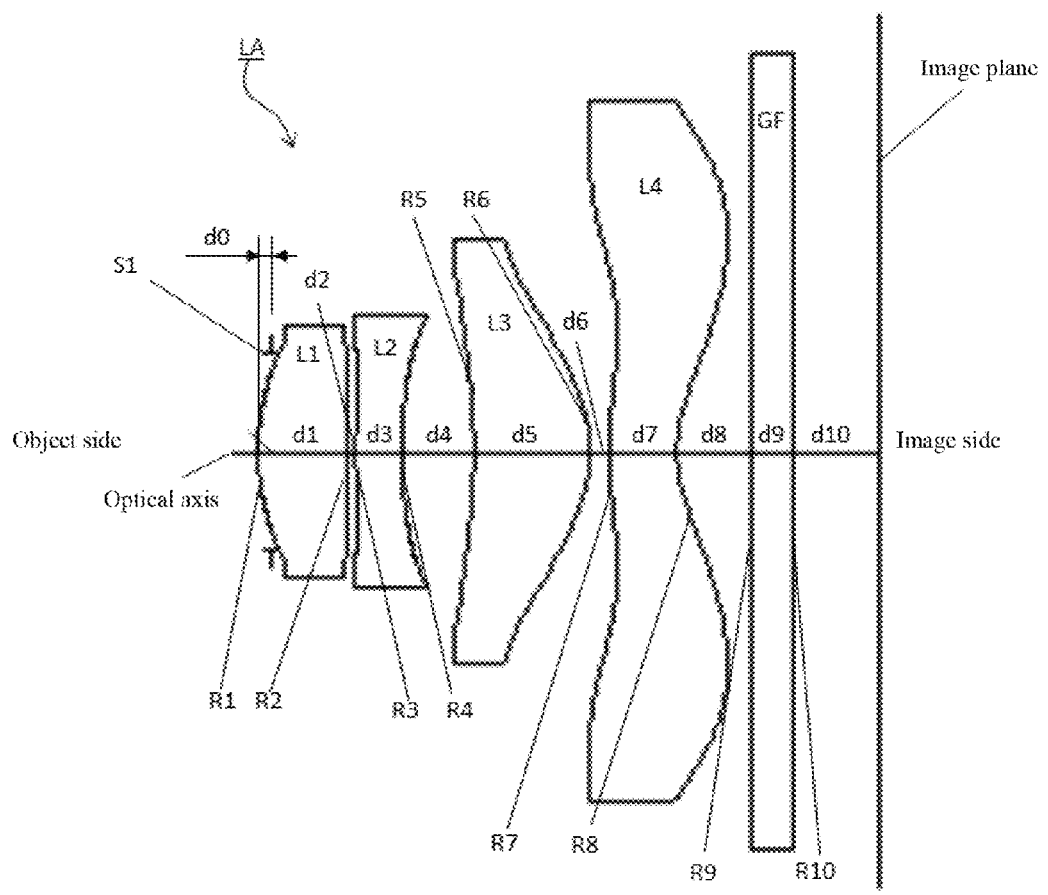
FIG. 1 is an illustrative structure of an imaging lens assembly related to the present disclosure.

Referring to FIG. 1, an imaging lens assembly LA related to the present disclosure includes, in order from an object side to an image side: an aperture stop S1, a first lens L1, a second lens L2, a third lens L3, and a fourth lens L4. A glass plate GF is arranged between the fourth lens L4 and an image plane. The glass plate GF may be a cover glass, an IR filter, or a low frequency filter. Alternatively, the glass plate may be arranged at other position.

The first lens L1 has a positive refractive power, the second lens L2 has a negative refractive power, the third lens L3 has a positive refractive power, and the fourth lens L4 has a negative refractive power. With the configuration of the refractive powers of the lenses, the imaging lens assembly LA may be miniaturized. Further, for correcting aberrations appropriately, these four lenses are configured to be aspherical.

The imaging lens assembly LA satisfies the following conditions (1)~(4):

$$1.08 \leq f1/f \leq 1.20 \tag{1}$$

$$-4.00 \leq f2/f \leq -2.50 \tag{2}$$

$$-1.50 \leq (R1+R2)/(R1-R2) \leq -1.25 \tag{3}$$

$$1.30 \leq (R3+R4)/(R3-R4) \leq 5.00 \tag{4}$$

Wherein:
f is a focal length of the imaging lens assembly LA;
f1 is a focal length of the first lens L1;
f2 is a focal length of the second lens L2;
R1 is a curvature radius of the object side surface of the first lens L1;
R2 is a curvature radius of the image side surface of the first lens L1;
R3 is a curvature radius of the object side surface of the second lens L2;
R4 is a curvature radius of the image side surface of the second lens L2.

Condition (1) prescribes the positive refractive power of the first lens L1. If the value excesses the minimum limit, the positive refractive power of the first lens L1 is too powerful to correct image aberration, and it is worse for wide-angle of the imaging lens assembly LA. If the value excesses the maximum limit, it weakens the positive refraction power of the first lens L1 and makes it difficult to miniaturize the imaging lens assembly LA.

Condition (2) prescribed the negative refractive power of the second lens L2. If the value excesses the minimum limit, it weakens the negative refractive power of the second lens L2, and makes it difficult to correct the on-axis and off-axis chromatic aberration. If the value excesses the maximum limit, the negative refractive power of the second lens L2 is too powerful to correct image aberrations. Meanwhile, high level image aberration causes axial eccentricity of the second lens L2, which further results in image distortion.

Condition (3) prescribes the shape of the first lens L1. If the value does not satisfy this condition, it is difficult to correct the high level image aberration, such as the spherical aberration, and so on, with the miniaturization and wide-angle development of the imaging lens assembly LA.

Condition (4) prescribes the shape of the second lens L2. If the value does not satisfy this condition, it is difficult to correct the on-axis chromatic aberration, with the miniaturization and wide-angle development of the imaging lens assembly LA.

The third lens L3 has a positive refractive power, and the imaging lens assembly LA satisfies the following conditions (5)-(6):

$$0.5 \leq f3/f \leq 0.75 \quad (5)$$

$$1.40 \leq (R5+R6)/(R5-R6) \leq 2.00 \quad (6)$$

Wherein:
f is the focal length of the imaging lens assembly LA;
f3 is a focal length of the third lens L3;
R5 is a curvature radius of the object side surface of the third lens L3;
R6 is a curvature radius of the image side surface of the third lens L3.

Condition (5) prescribes the positive refractive power of the third lens L3. If the value excesses the minimum limit, the positive refractive power of the third lens L3 is too powerful to correct image aberrations. Meanwhile, high level image aberration causes axial eccentricity of the third lens L3, which further results in image distortion. If the value excesses the maximum limit, the positive refractive power of the third lens L3 is weakened and it is difficult to miniaturize the imaging lens assembly LA.

Condition (6) prescribes the shape of the third lens L3. If the value does not satisfy this condition, it is worse for correcting image aberrations. Meanwhile, high level image aberration causes axial eccentricity of the third lens L3, which further results in image distortion.

The fourth lens L4 has a negative refractive power, and the imaging lens assembly LA satisfies the following conditions (7)-(8):

$$-0.80 \leq f4/f \leq -0.60 \quad (7)$$

$$1.20 \leq (R7+R8)/(R7-R8) \leq 2.50 \quad (8)$$

Wherein:
f is the focal length of the imaging lens assembly LA;
f4 is a focal length of the fourth lens L4;
R7 is a curvature radius of the object side surface of the fourth lens L4;
R8 is a curvature radius of the image side surface of the fourth lens L4.

Condition (7) prescribes the negative refractive power of the fourth lens L4. If the value excesses the minimum limit, it is difficult to correct the off-axis chromatic aberration. If the value excesses the maximum limit, high level image aberration causes axial eccentricity of the fourth lens L4, which further results in image distortion.

Condition (8) prescribes the shape of the fourth lens L4. If the value does not satisfy this condition, it is difficult to correct the off-axis chromatic aberration, with the miniaturization and wide-angle development of the imaging lens assembly LA.

By virtue of the configurations and conditions set forth in the forgoing description, an improved imaging lens assembly LA has the characteristics of miniaturization, wide-angle, TTL/IH $\leq$ 1.5, and $2\omega \geq 80°$.

Hereinafter, detailed embodiments will be described to test and verify the conditions set forth in the above descriptions.

The parameters of the imaging lens assembly LA are defined as follows, and the unit of each of the distance, radius, and thickness is millimeter (mm).
f: the focal length of the imaging lens assembly LA;
f1: the focal length of the first lens L1;
f2: the focal length of the second lens L2;
f3: the focal length of the third lens L3;
f4: the focal length of the fourth lens L4;
Fno: F number
$2\omega$: full visual angle
S1: aperture stop
R: curvature radius
R1: the curvature radius of the object side surface of the first lens L1;
R2: the curvature radius of the image side surface of the first lens L1;
R3: the curvature radius of the object side surface of the second lens L2;
R4: the curvature radius of the image side surface of the second lens L2;
R5: the curvature radius of the object side surface of the third lens L3;
R6: the curvature radius of the image side surface of the third lens L3;
R7: the curvature radius of the object side surface of the fourth lens L4;
R8: the curvature radius of the image side surface of the fourth lens L4;
R9: the curvature radius of the object side surface of the glass plate GF;
R10: the curvature radius of the image side surface of the glass plate GF;
d: the axial thickness of the lens, or distance between lenses;
d0: the axial distance between the aperture stop S1 and the object side surface of the first lens L1;

d1: the axial thickness of the first lens L1;
d2: the axial distance between the image side surface of the first lens L1 and the object side surface of the second lens L2;
d3: the axial thickness of the second lens L2;
d4: the axial distance between the image side surface of the second lens L2 and the object side surface of the third lens L3;
d5: the axial thickness of the third lens L3;
d6: the axial distance between the image side surface of the third lens L3 and the object side surface of the fourth lens L4;
d7: the axial thickness of the fourth lens L4;
d8: the axial distance between the image side surface of the fourth lens L4 and the object side surface of the glass plate GF;
d9: the axial thickness of the lass plate GF;
d10: the axial distance between the image side surface of the glass plate GF and the image plane;
nd: d line refraction index
n1: d line refraction index of the first lens L1;
n2: d line refraction index of the second lens L2;
n3: d line refraction index of the third lens L3;
n4: d line refraction index of the fourth lens L4;
n5: d line refraction index of the glass plate GF;
υd: abbe number
υ1: abbe number of the first lens L1;
υ2: abbe number of the second lens L2;
υ3: abbe number of the third lens L3;
υ4: abbe number of the fourth lens L4;
υ5: abbe number of the glass plate GF;
TTL: the axial distance between the aperture stop and the image plane (total track length);
IH: image height.

$$y=(x^2/R)/[1+\{1-(k+1)(x^2/R^2)\}^{1/2}]+A_4x^4+A_6x^6+A_8x^8++A_{10}x^{10}+A_{12}x^{12}+A_{14}x^{14} \quad (9)$$

Wherein, R is axial curvature radius, k is the conic coefficient, $A_4, A_6, A_8, A_{10}, A_{12}, A_{14}$ are the aspherical coefficients.

Optionally, each aspherical surface of each lens could be obtained according to condition (9). Of course, the aspherical surface may also be obtained according to other conditions.

Embodiment 1

Figure 2:
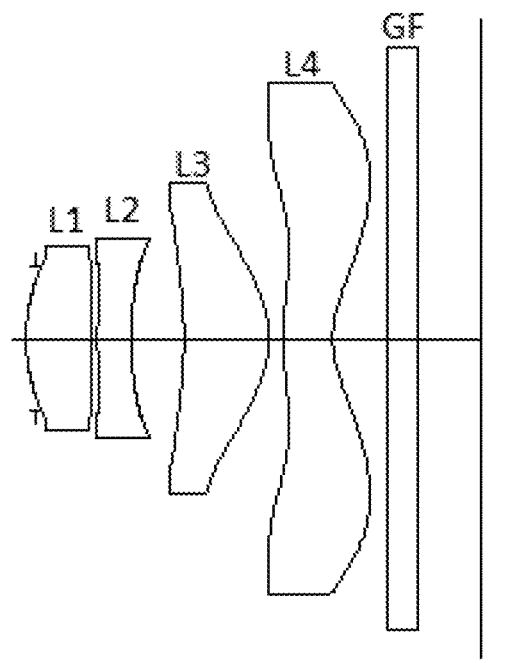
FIG. 2 is an illustrative structure of an imaging lens assembly related to a first embodiment of the present disclosure.

FIG. 2 shows an imaging lens assembly LA in accordance with Embodiment 1 of the present disclosure. TABLE 1 shows the detailed optical data of Embodiment 1. The conic coefficient and aspherical coefficient of the surfaces of the lenses of Embodiment 1 are listed in TABLE 2.

TABLE 1

|  | R | d |  | nd |  | υd |
|---|---|---|---|---|---|---|
| S1 | ∞ | d0 = | −0.060 |  |  |  |
| R1 | 1.26251 | d1 = | 0.465 | n1 | 1.545 | υ1 | 55.9 |
| R2 | 7.65953 | d2 = | 0.046 |  |  |  |
| R3 | 5.73675 | d3 = | 0.240 | n2 | 1.651 | υ2 | 21.5 |
| R4 | 2.42072 | d4 = | 0.378 |  |  |  |
| R5 | −2.71423 | d5 = | 0.607 | n3 | 1.545 | υ3 | 55.9 |
| R6 | −0.69373 | d6 = | 0.102 |  |  |  |
| R7 | 2.21222 | d7 = | 0.352 | n4 | 1.545 | υ4 | 55.9 |
| R8 | 0.61333 | d8 = | 0.400 |  |  |  |
| R9 | ∞ | d9 = | 0.210 | n5 | 1.517 | υ5 | 64.2 |
| R10 | ∞ | d10 = | 0.458 |  |  |  |

TABLE 2

|  | conic coefficient | aspherical coefficient | | | | | |
|---|---|---|---|---|---|---|---|
|  | k | A4 | A6 | A8 | A10 | A12 | A14 |
| R1 | −2.72E+01 | 1.50E+00 | −6.93E+00 | 2.24E+01 | −3.84E+01 | 2.46E+01 | 0.00E+00 |
| R2 | 1.92E+01 | −2.75E−01 | −1.25E+00 | 7.08E+00 | −1.21E+01 | 5.81E+00 | 0.00E+00 |
| R3 | 5.97E+01 | −3.12E−01 | −1.73E+00 | 9.09E+00 | −1.46E+01 | 7.43E+00 | 0.00E+00 |
| R4 | 3.37E+00 | 8.36E−02 | −8.02E−01 | 2.87E+00 | −3.32E+00 | 1.38E+00 | 0.00E+00 |
| R5 | 6.84E+00 | 2.94E−01 | −4.23E−01 | 6.87E−01 | −6.30E−01 | 2.85E−01 | 0.00E+00 |
| R6 | −4.39E+00 | −2.42E−01 | 3.50E−01 | −3.94E−03 | 4.18E−01 | −1.66E−01 | 0.00E+00 |
| R7 | −5.01E−01 | −3.71E−01 | 1.36E−01 | 4.70E−03 | −1.08E−02 | 1.55E−03 | −1.33E−05 |
| R8 | −4.79E+00 | −1.72E−01 | 7.68E−02 | −2.46E−02 | 3.65E−03 | −1.29E−04 | −2.28E−06 |

Figure 3:
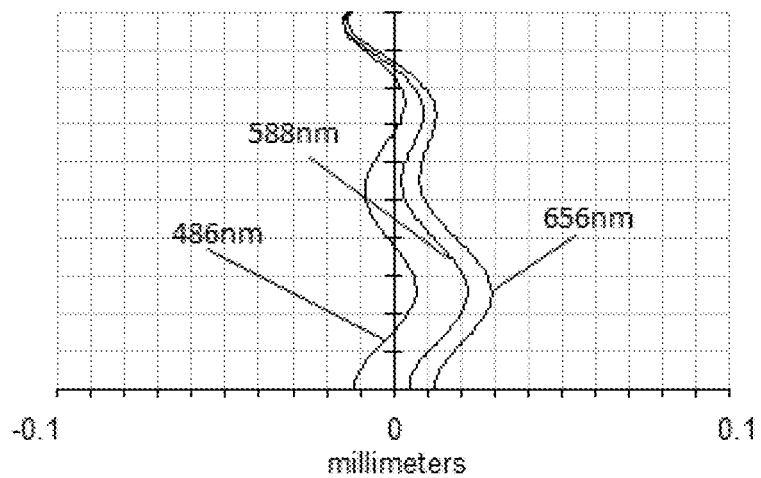
FIG. 3 is an aberration curve showing spherical aberration (on-axis chromatic aberration) of the imaging lens assembly of the first embodiment.
Figure 4:
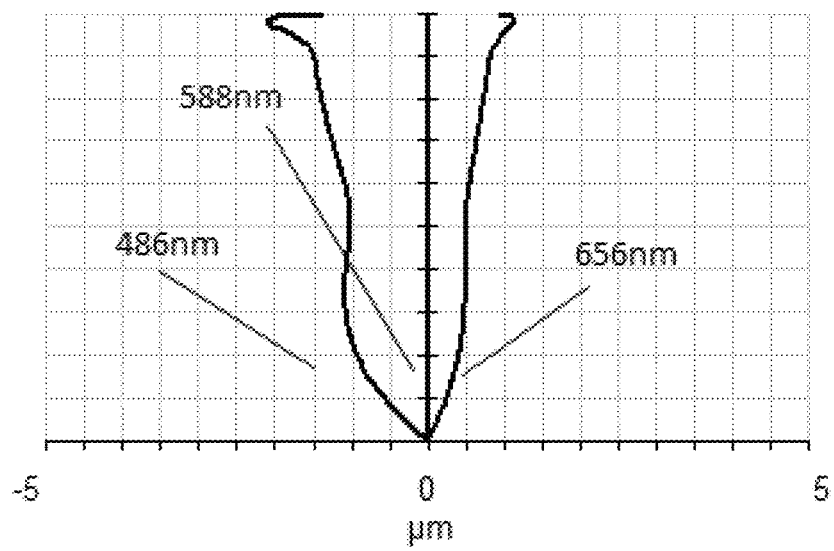
FIG. 4 is an aberration curve showing the ratio chromatic aberration of the imaging lens assembly of the first embodiment.
Figure 5:
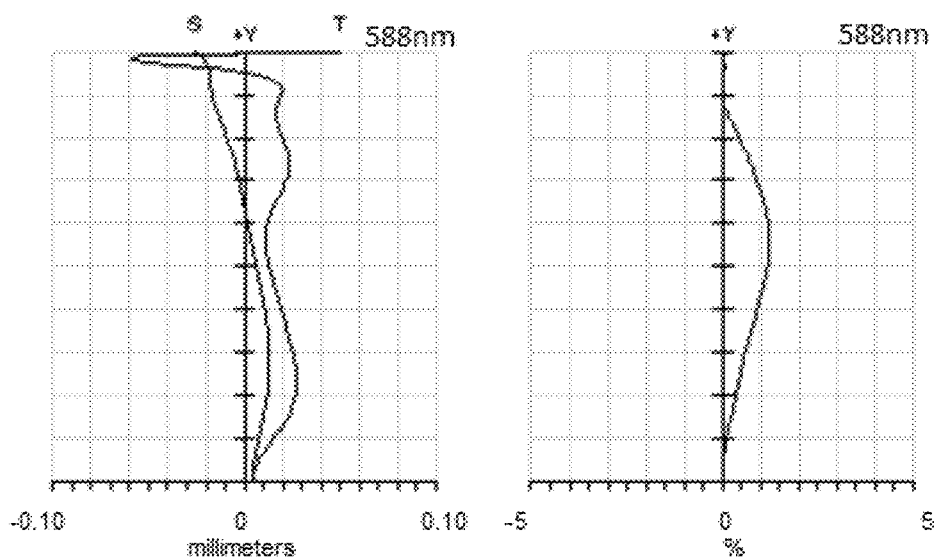
FIG. 5 is an aberration curve showing the curvature of field and the distortion of the imaging lens assembly of the first embodiment.

The subsequent TABLE 9 shows all the parameters of the imaging lens assembly of the embodiments corresponding to conditions (1)~(8). As shown in TABLE 9, the imaging lens assembly LA of Embodiment 1 satisfies all of the conditions (1)-(8). The spherical aberration (on-axis chromatic aberration) of the imaging lens assembly LA of Embodiment 1 is shown in FIG. 3. The ratio chromatic aberration is shown in FIG. 4. The curvature of field and the distortion aberration are shown in FIG. 5. Wherein, S shows the curvature of field corresponding to sagittal image surface, and T shows the curvature of field corresponding to tangential image surface. By virtue of the configuration, the imaging lens assembly LA of Embodiment 1 has the characteristics of wide-angle, miniaturization, 2ω=85.1°, and TTL/IH=1.437.

Embodiment 2

Figure 6:
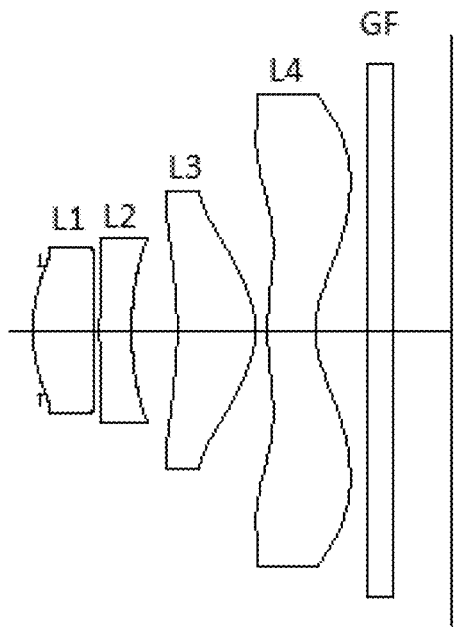
FIG. 6 is an illustrative structure of an imaging lens assembly related to a second embodiment of the present disclosure.

FIG. 6 shows an imaging lens assembly LA in accordance with Embodiment 2 of the present disclosure. TABLE 3 shows the detailed optical data of Embodiment 2. The conic coefficient and aspherical coefficient of the surfaces of the lenses of Embodiment 2 are listed in TABLE 4.

TABLE 3

|  | R | d |  | nd |  | υd |
|---|---|---|---|---|---|---|
| S1 | ∞ | d0 = | −0.060 |  |  |  |
| R1 | 1.28741 | d1 = | 0.467 | n1 | 1.545 | υ1 | 55.9 |
| R2 | 6.88005 | d2 = | 0.047 |  |  |  |
| R3 | 5.26402 | d3 = | 0.247 | n2 | 1.651 | υ2 | 21.5 |
| R4 | 2.51243 | d4 = | 0.351 |  |  |  |
| R5 | −2.76167 | d5 = | 0.603 | n3 | 1.545 | υ3 | 55.9 |
| R6 | −0.69170 | d6 = | 0.093 |  |  |  |
| R7 | 2.17796 | d7 = | 0.366 | n4 | 1.545 | υ4 | 55.9 |
| R8 | 0.61440 | d8 = | 0.400 |  |  |  |
| R9 | ∞ | d9 = | 0.210 | n5 | 1.517 | υ5 | 64.2 |
| R10 | ∞ | d10 = | 0.437 |  |  |  |

TABLE 4

| | conic coefficient | asphcrical cocfficient | | | | | |
|---|---|---|---|---|---|---|---|
| | k | A4 | A6 | A8 | A10 | A12 | A14 |
| R1 | −2.94E+01 | 1.51E+00 | −6.99E+00 | 2.23E+01 | −3.83E+01 | 2.49E+01 | 0.00E+00 |
| R2 | 4.21E+01 | −2.68E−01 | −1.23E+00 | 7.10E+00 | −1.22E+01 | 6.25E+00 | 0.00E+00 |
| R3 | 5.09E+01 | −3.12E−01 | −1.69E+00 | 9.16E+00 | −1.45E+01 | 7.00E+00 | 0.00E+00 |
| R4 | 3.21E+00 | 7.70E−02 | −7.96E−01 | 2.89E+00 | −3.34E+00 | 1.39E+00 | 0.00E+00 |
| R5 | 6.87E+00 | 2.96E−01 | −4.31E−01 | 6.82E−01 | −6.32E−01 | 2.86E−01 | 0.00E+00 |
| R6 | −4.33E+00 | −2.45E−01 | 3.51E−01 | −3.93E−03 | 4.19E−01 | −1.66E−01 | 0.00E+00 |
| R7 | −4.90E−01 | −3.71E−01 | 1.36E−01 | 4.72E−03 | −1.03E−02 | 1.55E−03 | −1.30E−05 |
| R8 | −4.72E+00 | −1.71E−01 | 7.71E−02 | −2.46E−02 | 3.65E−03 | −1.30E−04 | −2.68E−06 |

Figure 7:
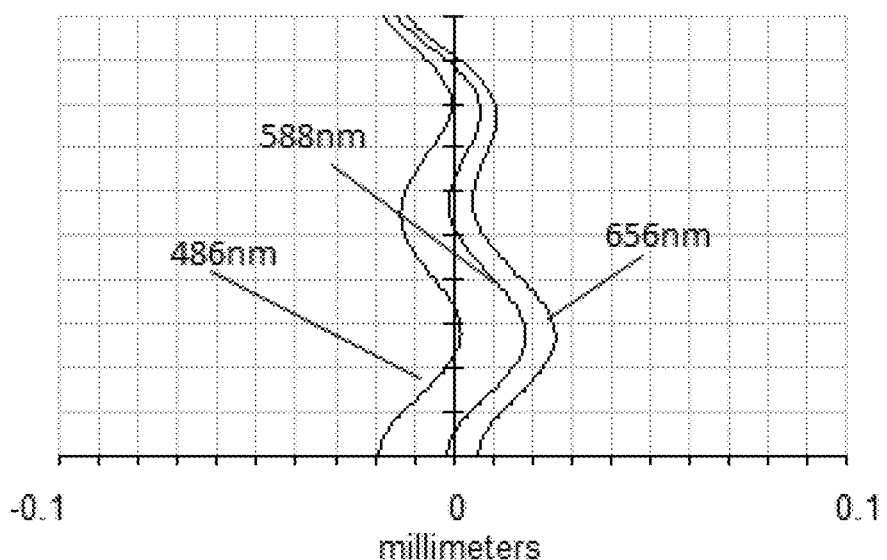
FIG. 7 is an aberration curve showing spherical aberration (on-axis chromatic aberration) of the imaging lens assembly of the second embodiment.
Figure 8:
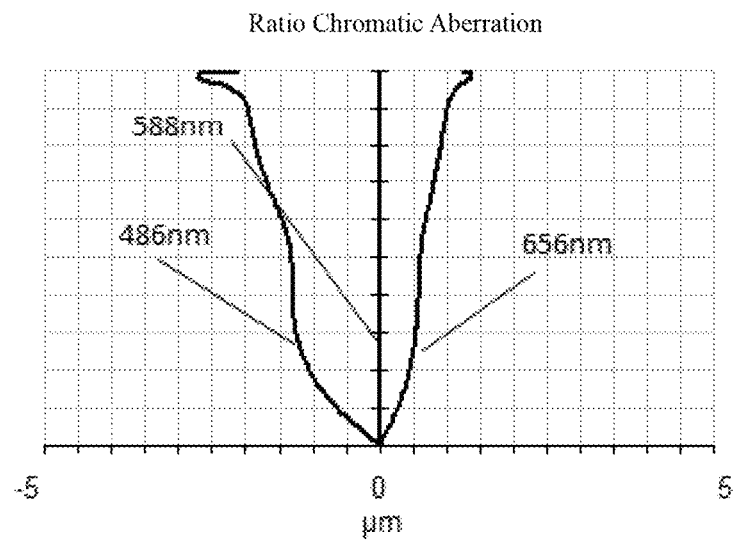
FIG. 8 is an aberration curve showing the ratio chromatic aberration of the imaging lens assembly of the second embodiment.
Figure 9:
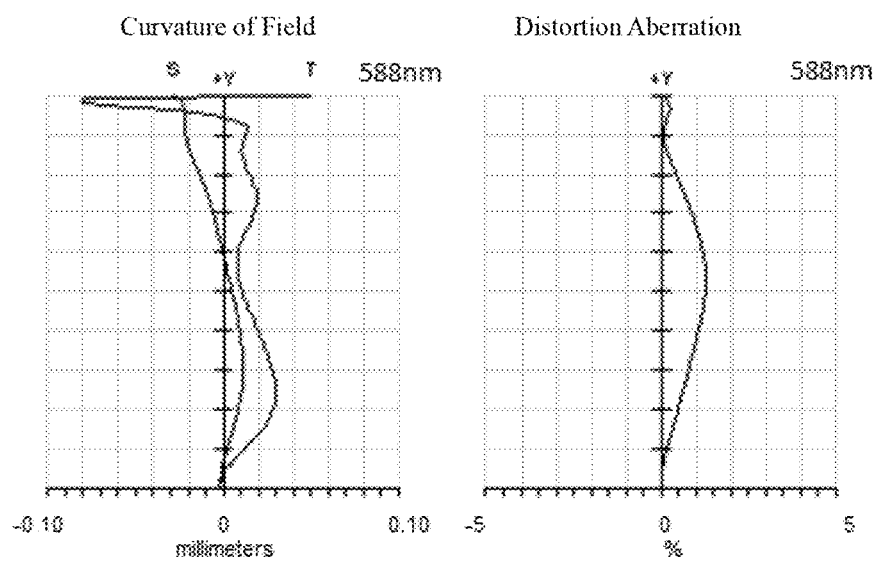
FIG. 9 is an aberration curve showing the curvature of field and the distortion of the imaging lens assembly of the second embodiment.

As shown in TABLE 9, the imaging lens assembly LA of Embodiment 2 satisfies all of the conditions (1)-(8). The spherical aberration (on-axis chromatic aberration) of the imaging lens assembly LA of Embodiment 2 is shown in FIG. 7. The ratio chromatic aberration is shown in FIG. 8. The curvature of field and the distortion aberration are shown in FIG. 9. By virtue of the configuration, the imaging lens assembly LA of Embodiment 2 has the characteristics of wide-angle, miniaturization, $2\omega=86.7°$, and TTL/IH=1.420.

Embodiment 3

Figure 10:
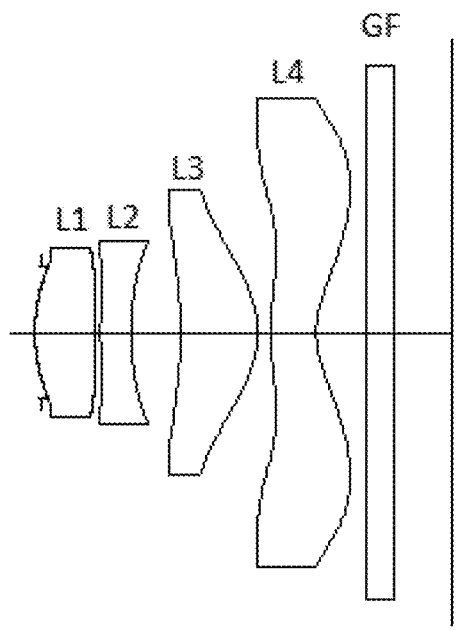
FIG. 10 is an illustrative structure of an imaging lens assembly related to a third embodiment of the present disclosure.

FIG. 10 shows an imaging lens assembly LA in accordance with Embodiment 3 of the present disclosure. TABLE 5 shows the detailed optical data of Embodiment 3. The conic coefficient and aspherical coefficient of the surfaces of the lenses of Embodiment 3 are listed in TABLE 6.

TABLE 5

| | R | d | | nd | | $\nu$d |
|---|---|---|---|---|---|---|
| S1 | ∞ | d0 = | −0.060 | | | |
| R1 | 1.29310 | d1 = | 0.466 | n1 | 1.545 | $\nu$1 | 55.9 |
| R2 | 9.63023 | d2 = | 0.046 | | | |
| R3 | 5.41138 | d3 = | 0.240 | n2 | 1.651 | $\nu$2 | 21.5 |
| R4 | 2.35484 | d4 = | 0.385 | | | |
| R5 | −2.70416 | d5 = | 0.602 | n3 | 1.545 | $\nu$3 | 55.9 |
| R6 | −0.69407 | d6 = | 0.102 | | | |
| R7 | 2.21374 | d7 = | 0.351 | n4 | 1.545 | $\nu$4 | 55.9 |
| R8 | 0.61316 | d8 = | 0.400 | | | |
| R9 | ∞ | d9 = | 0.210 | n5 | 1.517 | $\nu$5 | 64.2 |
| R10 | ∞ | d10 = | 0.459 | | | |

TABLE 6

| | conic coefficient | asphcrical cocfficient | | | | | |
|---|---|---|---|---|---|---|---|
| | k | A4 | A6 | A8 | A10 | A12 | A14 |
| R1 | −2.85E+01 | 1.46E+00 | −6.93E+00 | 2.25E+01 | −3.84E+01 | 2.33E+01 | 0.00E+00 |
| R2 | −5.93E+01 | −2.81E−01 | −1.28E+00 | 7.10E+00 | −1.22E+01 | 5.60E+00 | 0.00E+00 |
| R3 | 5.45E+01 | −3.18E−01 | −1.73E+00 | 9.06E+00 | −1.46E+01 | 7.22E+00 | 0.00E+00 |
| R4 | 3.28E+00 | 8.37E−02 | −8.19E−01 | 2.85E+00 | −3.27E+00 | 1.33E+00 | 0.00E+00 |
| R5 | 6.83E+00 | 2.92E−01 | −4.22E−01 | 6.88E−01 | −6.30E−01 | 2.84E−01 | 0.00E+00 |
| R6 | −4.39E+00 | −2.42E−01 | 3.49E−01 | −3.94E−03 | 4.18E−01 | −1.66E−01 | 0.00E+00 |
| R7 | −4.98E−01 | −3.71E−01 | 1.36E−01 | 4.70E−03 | −1.08E−02 | 1.55E−03 | −1.39E−05 |
| R8 | −4.79E+00 | −1.72E−01 | 7.68E−02 | −2.46E−02 | 3.65E−03 | −1.29E−04 | −2.37E−06 |

Figure 11:
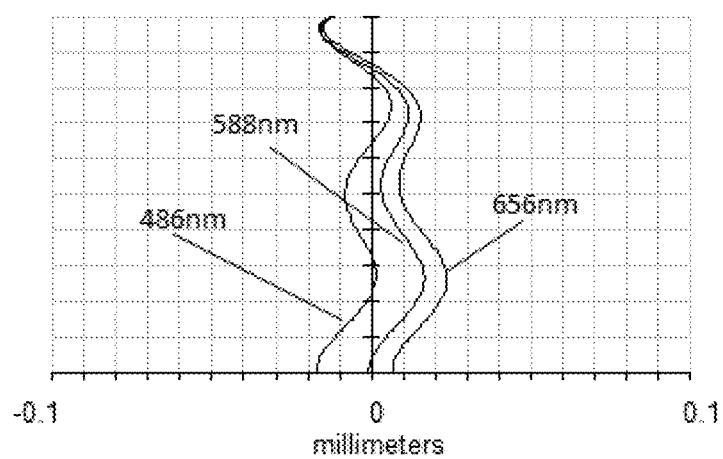
FIG. 11 is an aberration curve showing spherical aberration (on-axis chromatic aberration) of the imaging lens assembly of the third embodiment.
Figure 12:
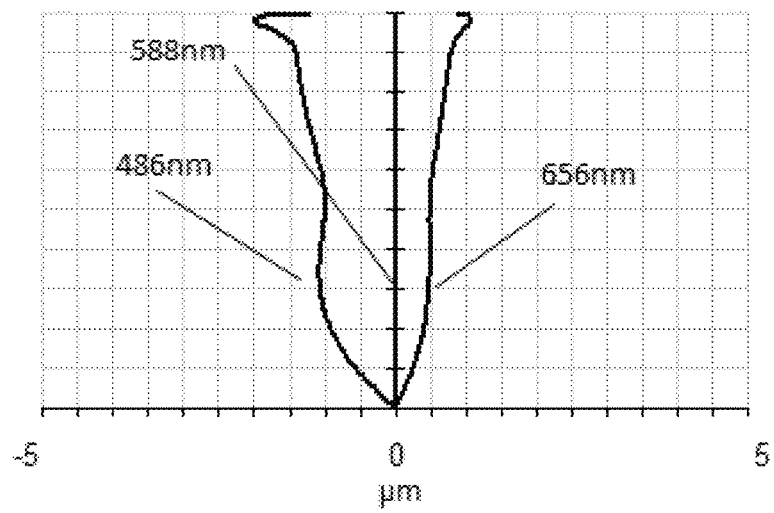
FIG. 12 is an aberration curve showing the ratio chromatic aberration of the imaging lens assembly of the third embodiment.
Figure 13:
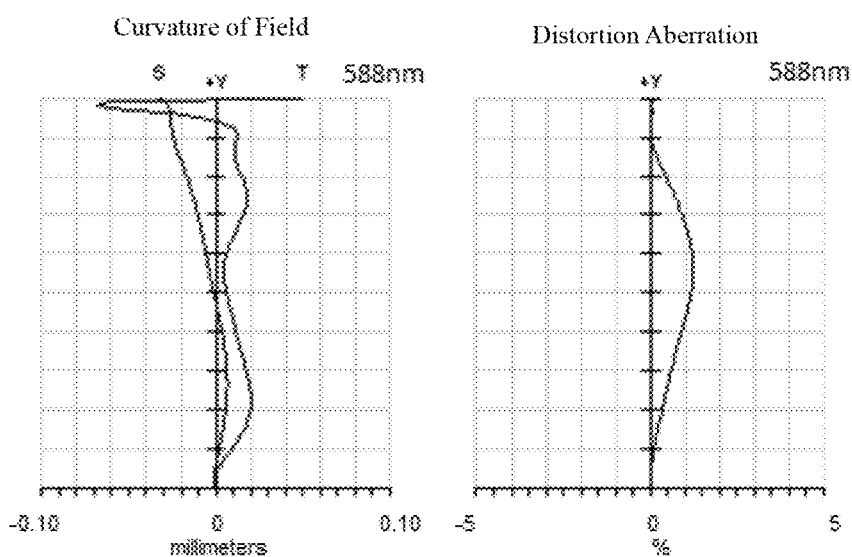
FIG. 13 is an aberration curve showing the curvature of field and the distortion of the imaging lens assembly of the third embodiment.

As shown in TABLE 9, the imaging lens assembly LA of Embodiment 3 satisfies all of the conditions (1)-(8). The spherical aberration (on-axis chromatic aberration) of the imaging lens assembly LA of Embodiment 3 is shown in FIG. 11. The ratio chromatic aberration is shown in FIG. 12. The curvature of field and the distortion aberration are shown in FIG. 13. By virtue of the configuration, the imaging lens assembly LA of Embodiment 3 has the characteristics of wide-angle, miniaturization, $2\omega=85.1°$, and TTL/IH=1.438.

Embodiment 4

Figure 14:
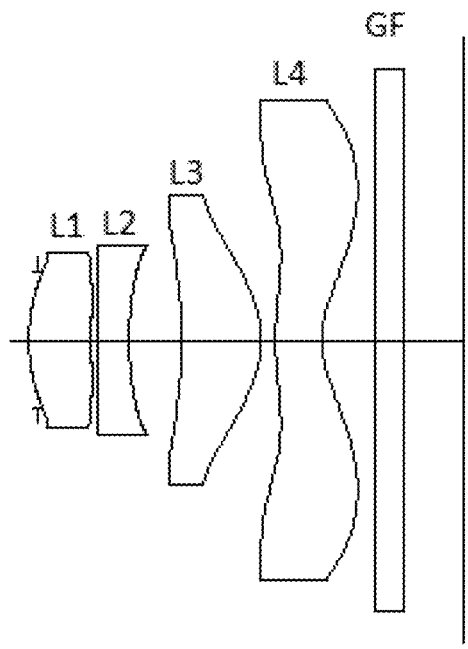
FIG. 14 is an illustrative structure of an imaging lens assembly related to a fourth embodiment of the present disclosure.

FIG. 14 shows an imaging lens assembly LA in accordance with Embodiment 4 of the present disclosure. TABLE 7 shows the detailed optical data of Embodiment 4. The conic coefficient and aspherical coefficient of the surfaces of the lenses of Embodiment 4 are listed in TABLE 8.

TABLE 7

| | R | d | | nd | | $\nu$d |
|---|---|---|---|---|---|---|
| S1 | ∞ | d0 = | −0.060 | | | |
| R1 | 1.29429 | d1 = | 0.470 | n1 | 1.545 | $\nu$1 | 55.9 |
| R2 | 6.92126 | d2 = | 0.044 | | | |
| R3 | 5.15559 | d3 = | 0.240 | n2 | 1.651 | $\nu$2 | 21.5 |
| R4 | 2.54508 | d4 = | 0.397 | | | |
| R5 | −2.68600 | d5 = | 0.594 | n3 | 1.545 | $\nu$3 | 55.9 |
| R6 | −0.69671 | d6 = | 0.108 | | | |
| R7 | 2.22429 | d7 = | 0.347 | n4 | 1.545 | $\nu$4 | 55.9 |
| R8 | 0.60901 | d8 = | 0.400 | | | |
| R9 | ∞ | d9 = | 0.210 | n5 | 1.517 | $\nu$5 | 64.2 |
| R10 | ∞ | d10 = | 0.465 | | | |

TABLE 8

| | conic coefficient | asphcrical cocfficient | | | | | |
|---|---|---|---|---|---|---|---|
| | k | A4 | A6 | A8 | A10 | A12 | A14 |
| R1 | −2.93E+01 | 1.49E+00 | −6.97E+00 | 2.23E+01 | −3.83E+01 | 2.49E+01 | 0.00E+00 |
| R2 | 1.70E+01 | −2.93E−01 | −1.24E+00 | 7.07E+00 | −1.22E+01 | 6.21E+00 | 0.00E+00 |
| R3 | 4.91E+01 | −3.15E−01 | −1.70E+00 | 9.15E+00 | −1.45E+01 | 6.91E+00 | 0.00E+00 |
| R4 | 3.71E+00 | 8.70E−02 | −7.87E−01 | 2.89E+00 | −3.35E+00 | 1.40E+00 | 0.00E+00 |
| R5 | 6.86E+00 | 2.85E−01 | −4.22E−01 | 6.88E−01 | −6.29E−01 | 2.88E−01 | 0.00E+00 |
| R6 | −4.46E+00 | −2.38E−01 | 3.47E−01 | −3.96E−03 | 4.17E−01 | −1.67E−01 | 0.00E+00 |
| R7 | −4.95E−01 | −3.71E−01 | 1.36E−01 | 4.69E−03 | −1.08E−02 | 1.54E−03 | −1.70E−05 |
| R8 | −4.78E+00 | −1.70E−01 | 7.69E−02 | −2.46E−02 | 3.65E−03 | −1.30E−04 | −2.77E−06 |

Figure 15:
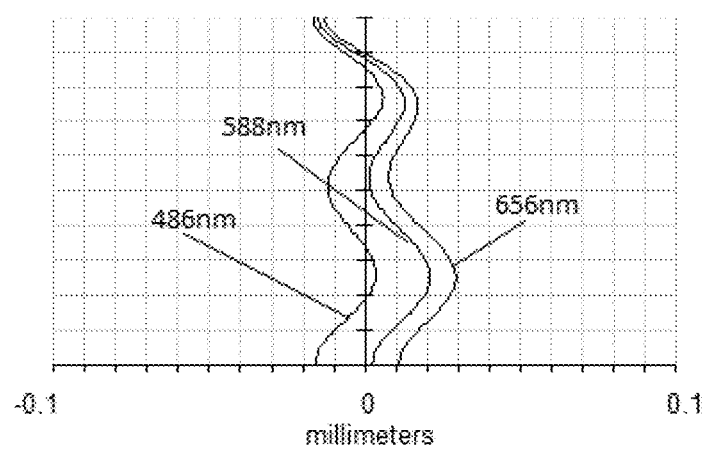
FIG. 15 is an aberration curve showing spherical aberration (on-axis chromatic aberration) of the imaging lens assembly of the fourth embodiment.
Figure 16:
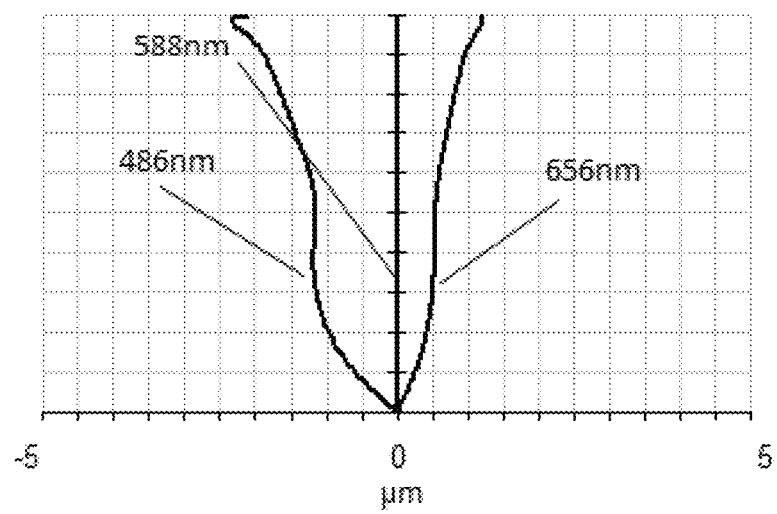
FIG. 16 is an aberration curve showing the ratio chromatic aberration of the imaging lens assembly of the fourth embodiment.
Figure 17:
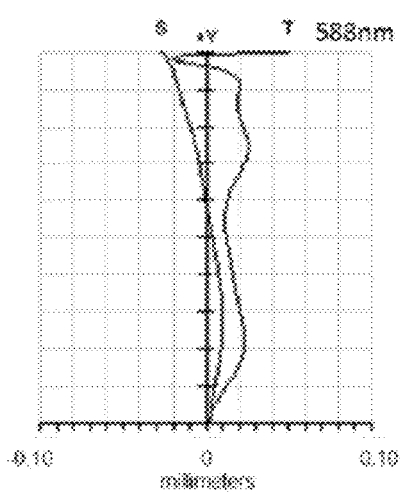
FIG. 17 is an aberration curve showing the curvature of field and the distortion of the imaging lens assembly of the fourth embodiment.
Figure 17:
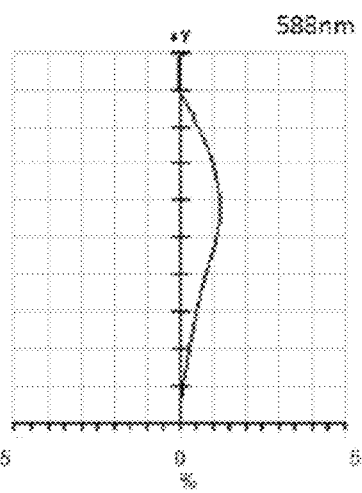

As shown in TABLE 9, the imaging lens assembly LA of Embodiment 4 satisfies all of the conditions (1)-(8). The spherical aberration (on-axis chromatic aberration) of the imaging lens assembly LA of Embodiment 4 is shown in FIG. 15. The ratio chromatic aberration is shown in FIG. 16. The curvature of field and the distortion aberration are shown in FIG. 17. By virtue of the configuration, the imaging lens assembly LA of Embodiment 4 has the characteristics of wide-angle, miniaturization, 2ω=84.5°, and TTL/IH=1.444.

TABLE 9 shows all the parameters of the imaging lens assembly of the embodiments corresponding to conditions (1)~(8).

TABLE 9

| | Embodiment 1 | Embodiment 2 | Embodiment 3 | Embodiment 4 |
|---|---|---|---|---|
| f1/f | 1.095 | 1.180 | 1.090 | 1.137 |
| f2/f | −2.680 | −3.200 | −2.680 | −3.210 |
| (R1 + R2)/(R1 − R2) | −1.395 | −1.460 | −1.310 | −1.460 |
| (R3 + R4)/(R3 − R4) | 2.460 | 2.826 | 2.541 | 2.950 |
| f3/f | 0.626 | 0.642 | 0.629 | 0.626 |
| (R5 + R6)/(R5 − R6) | 1.687 | 1.668 | 1.691 | 1.700 |
| f4/f | −0.683 | −0.716 | −0.684 | −0.667 |
| (R7 + R8)/(R7 − R8) | 1.767 | 1.786 | 1.766 | 1.754 |
| Fno | 2.40 | 2.40 | 2.40 | 2.40 |
| 2ω | 85.1 | 86.7 | 85.1 | 84.5 |
| f | 2.471 | 2.392 | 2.466 | 2.496 |
| f1 | 2.705 | 2.823 | 2.688 | 2.838 |
| f2 | −6.622 | −7.655 | −6.609 | −8.012 |
| f3 | 1.547 | 1.536 | 1.550 | 1.562 |
| f4 | −1.688 | −1.712 | −1.687 | −1.665 |
| TTL | 3.258 | 3.221 | 3.261 | 3.275 |
| LB | 1.068 | 1.047 | 1.069 | 1.075 |
| IH | 2.268 | 2.268 | 2.268 | 2.268 |
| TTL/IH | 1.437 | 1.420 | 1.438 | 1.444 |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging lens assembly, comprising in order from an object side to an image side:
    an aperture stop;
    a first lens having a positive refractive power;
    a second lens having a negative refractive power;
    a third lens having a positive refractive power;
    a fourth lens having a negative refractive power; wherein the imaging lens assembly satisfies the following conditions:

$$1.08 \leq f1/f \leq 1.20;$$

$$-4.00 \leq f2/f \leq -2.50;$$

$$-1.50 \leq (R1+R2)/(R1-R2) \leq -1.25;$$

$$1.30 \leq (R3+R4)/(R3-R4) \leq 5.00;$$

where:
    f is a focal length of the imaging lens assembly;
    f1 is a focal length of the first lens;
    f2 is a focal length of the second lens;
    R1 is a curvature radius of the object side surface of the first lens;
    R2 is a curvature radius of the image side surface of the first lens;
    R3 is a curvature radius of the object side surface of the second lens;
    R4 is a curvature radius of the image side surface of the second lens.

2. The imaging lens assembly of claim 1 further satisfies the following conditions:

$$0.5 \leq f3/f \leq 0.75;$$

$$1.40 \leq (R5+R6)/(R5-R6) \leq 2.00;$$

where:
    f3 is a focal length of the third lens;
    R5 is a curvature radius of the object side surface of the third lens;
    R6 is a curvature radius of the image side surface of the third lens.

3. The imaging lens assembly of claim 1 further satisfies the following conditions:

$$-0.80 \leq f4/f \leq -0.60;$$

$$1.20 \leq (R7+R8)/(R7-R8) \leq 2.50;$$

where:

f4 is a focal length of the fourth lens;

R7 is a curvature radius of the object side surface of the fourth lens;

R8 is a curvature radius of the image side surface of the fourth lens.

\* \* \* \* \*